(12) United States Patent
Kishino et al.

(10) Patent No.: US 8,146,433 B2
(45) Date of Patent: Apr. 3, 2012

(54) FAILURE DETECT DEVICE AND FAILURE DETECT METHOD

(75) Inventors: Mitsuhiro Kishino, Hadano (JP);
Hisashi Kudou, Fujisawa (JP);
Masayuki Ashizawa, Fuji (JP); Hiromu Soya, Hiratsuka (JP)

(73) Assignee: Jatco Ltd, Fuji-shi (JP)

( * ) Notice: Subject to any disclaimer, the term of this patent is extended or adjusted under 35 U.S.C. 154(b) by 407 days.

(21) Appl. No.: 12/548,985

(22) Filed: Aug. 27, 2009

(65) Prior Publication Data
US 2010/0064814 A1  Mar. 18, 2010

(30) Foreign Application Priority Data
Sep. 17, 2008 (JP) .................. 2008-237864

(51) Int. Cl.
*G01M 13/00* (2006.01)
*G01M 1/22* (2006.01)
*G01H 11/00* (2006.01)
(52) U.S. Cl. ............... 73/660; 73/593; 73/659
(58) Field of Classification Search ............... 73/660, 73/593, 646, 649, 659
See application file for complete search history.

(56) References Cited

U.S. PATENT DOCUMENTS

| | | | | |
|---|---|---|---|---|
| 5,206,816 A * | 4/1993 | Hill et al. | ........................ | 702/56 |
| 5,412,985 A * | 5/1995 | Garcia et al. | ..................... | 73/460 |
| 5,744,723 A * | 4/1998 | Piety | ................ | 73/660 |
| 6,584,849 B2 * | 7/2003 | Loftus et al. | ..................... | 73/659 |
| 6,768,938 B2 * | 7/2004 | McBrien et al. | ............... | 701/100 |
| 6,876,715 B2 * | 4/2005 | Hikida et al. | .................. | 376/372 |
| 7,509,862 B2 * | 3/2009 | Cohen et al. | ..................... | 73/660 |
| 7,836,772 B2 * | 11/2010 | Twerdochlib | ................... | 73/661 |
| 7,861,592 B2 * | 1/2011 | Twerdochlib | ................... | 73/660 |
| 7,866,213 B2 * | 1/2011 | Twerdochlib | ................... | 73/659 |
| 7,941,281 B2 * | 5/2011 | Rai et al. | ......................... | 702/34 |
| 7,987,725 B2 * | 8/2011 | Twerdochlib | ................... | 73/661 |
| 2008/0033695 A1 | 2/2008 | Sahara et al. | | |

FOREIGN PATENT DOCUMENTS

| | | |
|---|---|---|
| EP | 1 686 359 A1 | 8/2006 |
| JP | 06-241297 A | 8/1994 |
| JP | 11-118592 A | 4/1999 |
| JP | 2002-211396 A | 7/2002 |
| JP | 2005-098984 A | 4/2005 |
| JP | 2005-227172 A | 8/2005 |
| JP | 2007-108189 A | 4/2007 |
| JP | 2007-285875 A | 11/2007 |
| JP | 2007-304031 A | 11/2007 |

* cited by examiner

*Primary Examiner* — J M Saint Surin
(74) *Attorney, Agent, or Firm* — Foley & Lardner LLP (57) ABSTRACT

A failure detect device detects the presence of a failure in a peripheral member of a rotary shaft by analyzing a vibration generated in a device provided with the rotary shaft when the rotary shaft is rotated. A vibration detection unit detects the vibration of the device, and a rotation speed detection unit detects a rotation speed of the rotary shaft. An analysis unit calculates a frequency spectrum of the vibration of the device and determines an actually measured vibration level at each vibration order by dividing a frequency component of the calculated frequency spectrum by the rotation speed of the rotary shaft. A detection unit detects the presence of a failure in the peripheral member on the basis of the actually measured vibration level at each vibration order.

18 Claims, 7 Drawing Sheets

PERIPHERAL MEMBER 22a

| MEMBER NAME | REFERENCE ORDER VALUE | REFERENCE VIBRATION LEVEL (dB) |
|---|---|---|
| BEARING A | 4.1 | -39.6 |
| BEARING B | 5.8 | -46.1 |
| BEARING C | 7 | -42.2 |
| GEAR A | 28 | -70.6 |
| OIL PUMP | 11 | -81.5 |

FAILURE DETECT DEVICE AND FAILURE DETECT METHOD

TECHNICAL FIELD OF THE INVENTION

This invention relates to a failure detect device and a failure detect method for detecting a failure in a rotatable and movable member such as a bearing or a gear used in an axle, a transmission, or the like of a vehicle such as an automobile.

BACKGROUND OF THE INVENTION

A technique for detecting a failure accompanying rotation of a member such as a bearing or a gear used in an axle, a transmission, or the like of a vehicle such as an automobile is required. JP2007-108189A discloses a technique for detecting a failure in these members using a frequency spectrum calculated on the basis of a vibration signal generated from a piece of mechanical equipment comprising the members.

SUMMARY OF THE INVENTION

The technique disclosed in JP2007-108189A uses a frequency spectrum to detect a failure. During a shift or the like in which a rotation speed of the axle varies, the frequency spectrum used here is affected by the variation in the rotation speed so as to take a different waveform. More specifically, the waveform differs in that a frequency value indicating an intensity peak of the vibration shifts.

However, in the technique disclosed in JP2007-108189A, this point is not taken into account and a failure is detected using a frequency spectrum that may take different waveforms. Therefore, during a shift, a failure cannot be detected appropriately.

An object of this invention is to detect a failure appropriately even during a shift.

According to an aspect of the present in invention, a failure detect device that detects the presence of a failure in a predetermined peripheral member disposed to either one of a rotary shaft and a power transmission path that passes through the rotary shaft by analyzing a vibration generated in a device provided with the rotary shaft when the rotary shaft is rotated is provided. The failure detect device includes a vibration detecting unit that detects the vibration of the device, a rotation speed detecting unit that detects a rotation speed of the rotary shaft, an analyzing unit that calculates a frequency spectrum of the vibration detected by the vibration detecting unit and determining an actually measured vibration level at each vibration order by dividing a frequency component of the calculated frequency spectrum by the rotation speed detected by the rotation speed detecting unit, and a detecting unit that detects the presence of a failure in the predetermined peripheral member on the basis of the actually measured vibration level at each vibration order determined by the analyzing unit.

According to another aspect of the present in invention, a failure detect method for detecting the presence of a failure in a predetermined peripheral member disposed to either one of a rotary shaft and a power transmission path that passes through the rotary shaft by analyzing a vibration generated in a device provided with the rotary shaft when the rotary shaft is rotated is provided. The failure detect method includes a vibration detecting step for detecting the vibration of the device, a rotation speed detecting step for detecting a rotation speed of the rotary shaft, an analyzing step for calculating a frequency spectrum of the vibration detected by the vibration detecting step and determining an actually measured vibration level at each vibration order by dividing a frequency component of the calculated frequency spectrum by the rotation speed detected by the rotation speed detecting step, and a detecting step for detecting the presence of a failure in the predetermined peripheral member on the basis of the actually measured vibration level at each vibration order determined by the analyzing step.

According to these aspects, the presence of a failure is detected on the basis of the actually measured vibration level at each vibration order. The vibration order used here is a parameter that does not vary even during a shift, and therefore a failure can be detected appropriately even during a shift.

The details as well as other features and advantages of these aspects are set forth in the remainder of the specification and are shown in the accompanying drawings.

DESCRIPTION OF THE PREFERRED EMBODIMENTS

An embodiment of this invention will be described below with reference to the attached drawings.

(Constitutional Example of Device)

Figure 1:
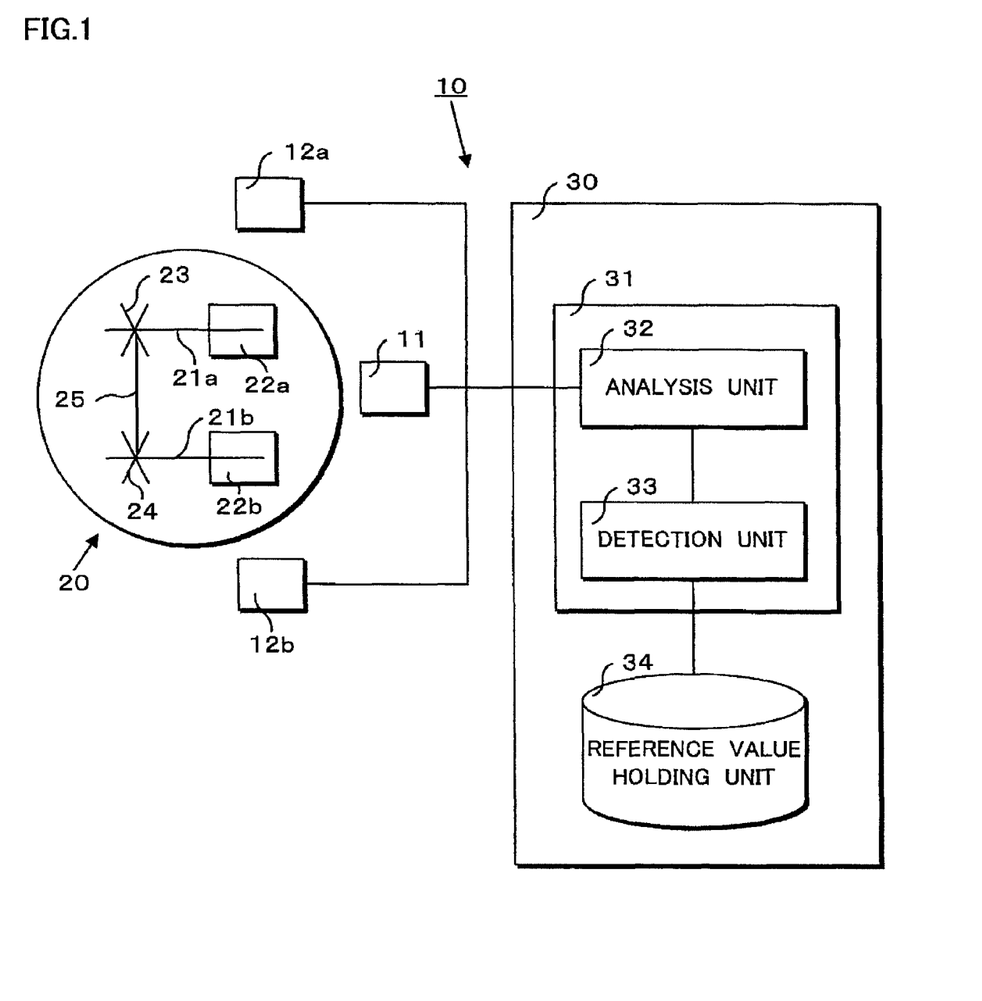
FIG. 1 is a view showing the schematic constitution of a failure detect device according to an embodiment of this invention.

FIG. 1 is a view showing the schematic constitution of a failure detect device according to an embodiment of this invention. In FIG. 1, a failure detect device 10 comprises a vibration detection unit 11, a first rotation speed detection unit 12a, a second rotation speed detection unit 12b, and a PC (Personal Computer) unit 30. The failure detect device 10 detects the presence of a failure in a rotatable and movable member of a detection subject device 20.

The detection subject device 20 is a continuously variable transmission (CVT) including at least a first rotary shaft (input shaft) 21a, a second rotary shaft (output shaft) 21b, variable pulleys 23, 24, and a belt 25.

The various constitutional elements of the failure detect device 10 will now be described.

The vibration detection unit 11 detects vibration in the detection subject device 20. For example, the vibration detection unit 11 detects a signal expressing periodic variation in a physical quantity of displacement, speed, or acceleration in the detection subject device 20, or in other words vibration, from a displacement sensor, a speed sensor, or an acceleration sensor disposed directly on the center of the detection subject device 20.

The first rotation speed detection unit 12a detects a rotation speed of the first rotary shaft 21a. For example, the first rotation speed detection unit 12a detects a signal expressing the rotation speed of the first rotary shaft 21a from a rotation sensor provided in the vicinity of or attached integrally to the first rotary shaft 21a.

The second rotation speed detection unit 12b detects a signal expressing a rotation speed of the second rotary shaft 21b. For example, the second rotation speed detection unit 12b detects a signal expressing the rotation speed of the second rotary shaft 21b from a rotation sensor provided in the vicinity of or attached integrally to the second rotary shaft 21b.

The PC unit 30 is a control unit constituted by a microcomputer including a CPU (Central Processing Unit) and peripheral devices thereof. The PC unit 30 comprises an analysis/detection unit 31 and a reference value holding unit 34.

The analysis/detection unit 31 detects the presence of a failure in the detection subject device 20 using an analysis unit 32 and a detection unit 33 on the basis of the signals detected by the respective detection units 11 to 12b described above. The analysis/detection unit 31 is realized by software that operates on an OS (Operating System) of the PC unit 30. The analysis unit 32 and the detection unit 33 will be described below.

The reference value holding unit 34 holds reference value data used during detection by the detection unit 33 of the analysis/detection unit 31, and is constituted by a recording device such as a hard disk or a RAM (Random Access Memory), for example.

With the device constitution described above, the failure detect device 10 detects the presence of a failure in a rotatable and movable member of the detection subject device 20 by analyzing the vibration that is detected by the vibration detection unit 11. Strictly speaking, the failure detect device 10 detects the presence of a failure in a peripheral member (input shaft peripheral member) 22a of the first rotary shaft 21a and a peripheral member (output shaft peripheral member) 22b of the second rotary shaft 21b in the detection subject device 20.

The peripheral member 22a is a member which is attached to the first rotary shaft 21a or disposed on a power transmission path passing through the first rotary shaft 21a, and which causes the waveform of the signal detected by the vibration detection unit 11 to vary when a failure occurs therein. For example, the peripheral member 22a is a bearing, not shown in the drawing, that supports the first rotary shaft 21a rotatably, a gear or an oil pump, not shown in the drawing, attached integrally to the first rotary shaft 21a, a gear, not shown in the drawing, disposed to be capable of meshing with the gear, or similar. This description applies likewise to the peripheral member 22b.

(Analysis Unit)

Figure 2:
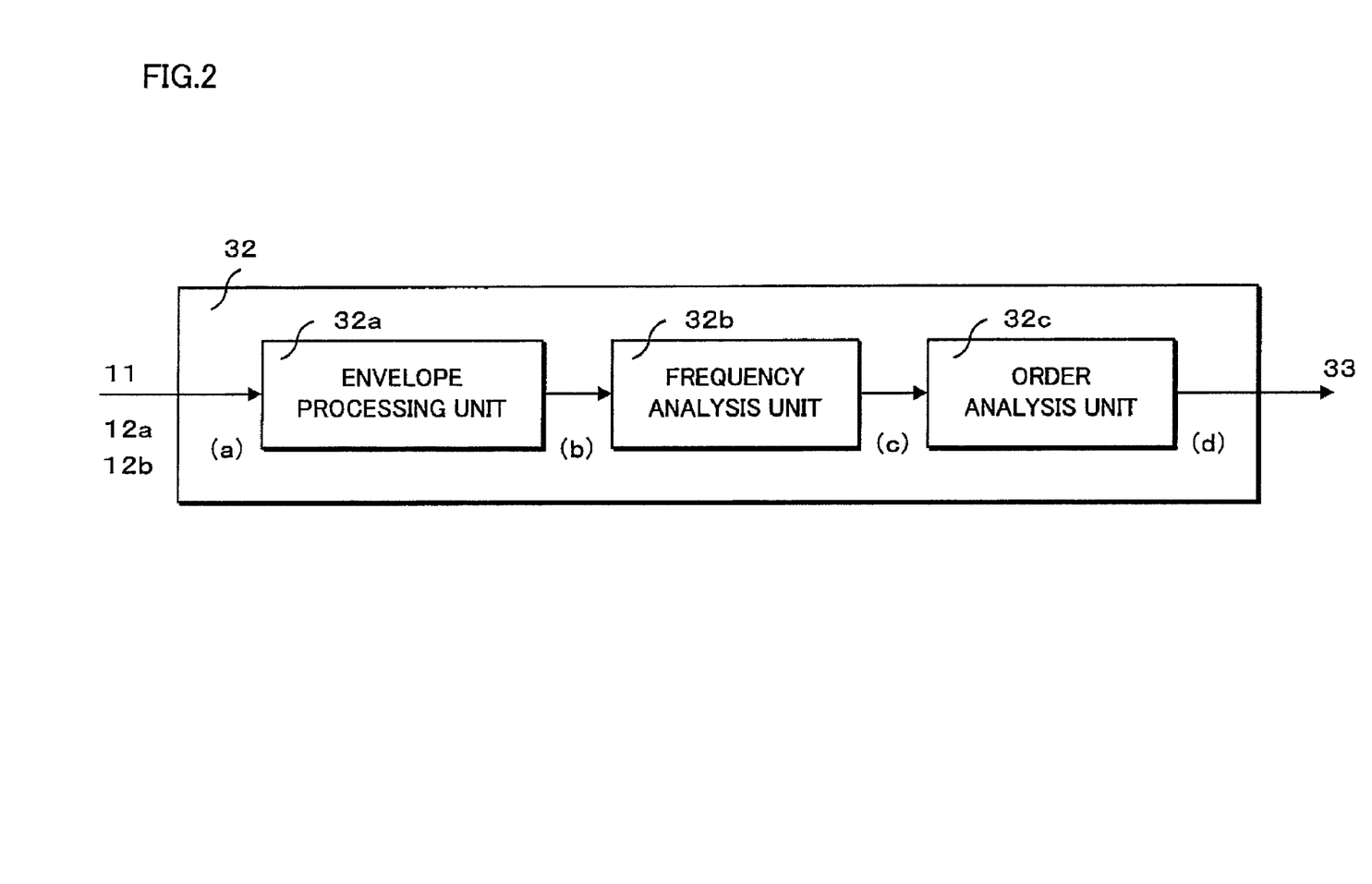
FIG. 2 is a view showing an example of the block diagram of an analysis unit.

FIG. 2 is a view showing the functional constitution of the analysis unit 32. The analysis unit 32 shown in FIG. 2 corresponds to the analysis unit 32 shown in FIG. 1.

The analysis unit 32 uses an envelope processing unit 32a, a frequency analysis unit 32b, and an order analysis unit 32c to analyze the signals detected by the respective detection units 11 to 12b. An analysis result is transmitted to the detection unit 33.

The envelope processing unit 32a implements envelope processing on the signal expressing the vibration detected by the vibration detection unit 11. In envelope processing, a complex number is calculated from an orthogonal coordinate value of a vibration waveform of the vibration signal and a Hilbert-transformed waveform, and an output which is commensurate with an envelope of the vibration waveform is obtained by enveloping an absolute value waveform of the calculated complex number.

The frequency analysis unit 32b calculates a frequency spectrum by implementing frequency conversion processing on the signal subjected to envelope processing by the envelope processing unit 32a using an FFT algorithm or the like.

The order analysis unit 32c determines an actually measured vibration level at each vibration order by dividing a frequency component of the frequency spectrum calculated by the frequency analysis unit 32b by the rotation speed detected by the first rotation speed detection unit 12a or the second rotation speed detection unit 12b.

As described above, the analysis unit 32 determines the actually measured vibration level at each vibration order on the basis of the signal expressing the vibration detected by the vibration detection unit 11 and the rotation speed detected by the first rotation speed detection unit 12a or the second rotation speed detection unit 12b. Hereafter, this series of analysis processes executed by the analysis unit 32 will be referred to as "real time special function order analysis".

(Specific Example of Analysis Operation by Analysis Unit)

A specific example of an analysis operation performed by the analysis unit 32 will now be described. It should be noted that for ease of description in the specific example to be described below, a case in which a failure occurs in the peripheral member 22a of the detection subject device 20 will be described (in other words, the peripheral member 22b will not be considered). In this case, the analysis unit 32 analyzes the detection results generated by the vibration detection unit 11 and the first rotation speed detection unit 12a (in other words, the second rotation speed detection unit 12b is not considered).

Figure 3A:
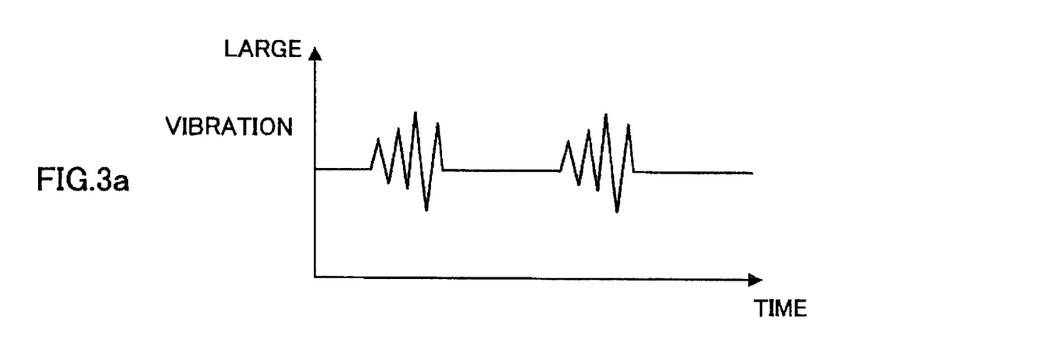
FIGS. 3a to 3d are views illustrating data variation before and after various function units shown in FIG. 2.

FIGS. 3a to 3d are views illustrating data variation before and after the various function units shown in FIG. 2. FIGS. 3a to 3d correspond respectively to a to d in FIG. 2. FIG. 3a shows an example of the signal expressing the vibration detected by the vibration detection unit 11 when a failure occurs in the peripheral member 22a.

Figure 3B:
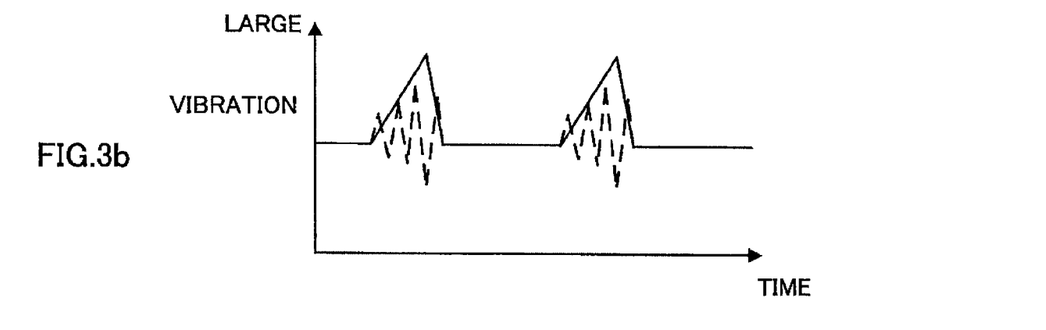

By implementing envelope processing on a signal such as that shown in FIG. 3a, the envelope processing unit 32a obtains a signal in which an entire impact, as shown by a solid line in FIG. 3b, is converted into a single periodic vibration.

Figure 3C:
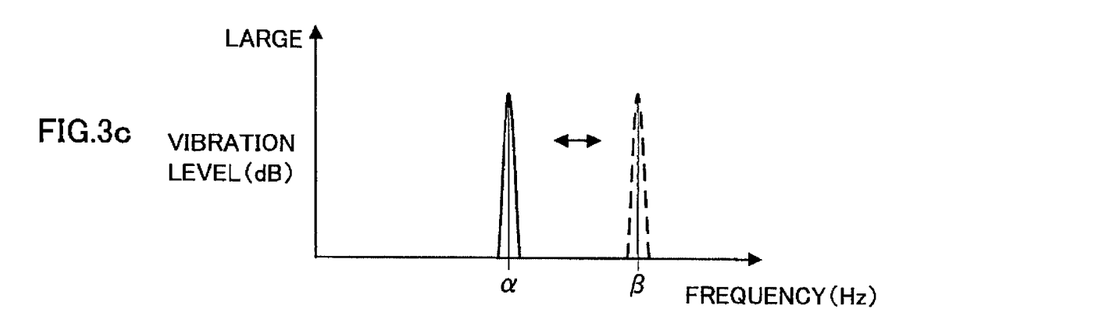

By implementing frequency conversion processing on the signal shown by the solid line in FIG. 3b, the frequency analysis unit 32b calculates a frequency spectrum such as that shown by a solid line in FIG. 3c. In the frequency spectrum shown by the solid line in FIG. 3c, a frequency level peak occurs at a natural frequency value $\alpha$ of the peripheral member 22a. However, when the rotation speed of the first rotary shaft 21a varies, the frequency value at which a peak occurs in the vibration level shifts to a difference frequency value $\beta$, as shown by a dotted line in FIG. 3c. In other words, the frequency value indicating the vibration level peak varies in accordance with variation in the rotation speed of the first rotary shaft 21a. Therefore, even when a frequency spectrum that can take different waveforms is used, the peripheral member 22a cannot be identified during a shift in which the rotation speed of the first rotary shaft 21a varies.

Figure 3D:
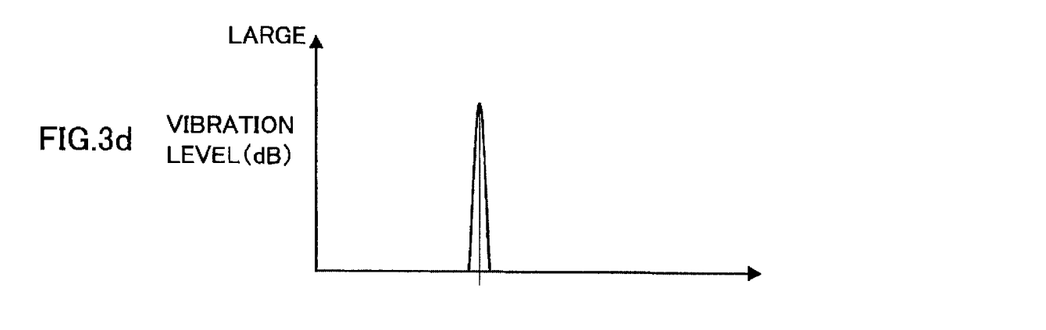

By dividing the respective frequency components of a frequency spectrum such as that shown by the solid line or the dotted line in FIG. 3c by the rotation speed of the first rotary shaft 21a prior to rotation speed variation or following rotation speed variation, in both cases the order analysis unit 32c converts the respective frequency components into data in which the vibration order of the first rotary shaft 21a is associated with the actually measured vibration level, as shown in FIG. 3d.

In the actually measured vibration level at each vibration order, shown in FIG. 3d, the vibration level peak occurs at a natural vibration order value γ of the peripheral member 22*a*. The vibration order determined here is a parameter that does not vary even during a shift in which the rotation speed of the first rotary shaft 21*a* varies. Therefore, by using the actually measured vibration level at each vibration order in this manner, the peripheral member 22*a* can be identified even during a shift in which the rotation speed of the first rotary shaft 21*a* varies.

As described above, in the analysis unit 32, the actually measured vibration level at each vibration order (FIG. 3*d*) is determined on the basis of the signal (FIG. 3*a*) expressing the vibration detected by the vibration detection unit 11.

More specifically, to detect the presence of a failure in the peripheral member 22*a*, the analysis unit 32 calculates the frequency spectrum of the vibration detected by the vibration detection unit 11, and determines the actually measured vibration level at each vibration order of the first rotary shaft 21*a* by dividing a frequency component of the calculated frequency spectrum by the rotation speed detected by the first rotation speed detection unit 12*a*.

To detect the presence of a failure in the other peripheral member 22*b*, the analysis unit 32 calculates the frequency spectrum of the vibration detected by the vibration detection unit 11, and determines an actually measured vibration level at each vibration order of the second rotary shaft 21*b* by dividing a frequency component of the calculated frequency spectrum by the rotation speed detected by the second rotation speed detection unit 12*b*.

(Detection Unit)

The detection unit 33 detects the presence of a failure in the detection subject device 20 on the basis of the actually measured vibration level at each vibration order, determined by the analysis unit 32. During the detection, reference value data held by the reference value holding unit 34 are used.

Further, having detected the presence of a failure, the detection unit 33 informs a user of the failure by displaying a message indicating the failure on a monitor or issuing a warning sound. Moreover, when a test such as a durability test is underway in the detection subject device 20, the detection unit 33 stops the test.

(Specific Example of Detection Operation by Detection Unit)

A specific example of a detection operation performed by the detection unit 33 will now be described. It should be noted that in the following specific example, a case in which data relating to an actually measured vibration level at each vibration order shown in FIG. 4*a* are determined by the analysis unit 32 and reference value data shown in FIG. 4*b* are held in the reference value holding unit 34 will be described.

The reference value data shown in FIG. 4*b* will now be described. As shown in FIG. 4*b*, reference value data constituted by reference order values (synonymous with the aforementioned "natural vibration order value") and reference vibration levels set in relation to the respective peripheral members are held in the reference value holding unit 34. Here, reference order values and reference vibration levels set in relation to each of bearings A, B, C, a gear A, and an oil pump, each of which serves as the peripheral member 22*a*, (for example, 4.1 and −39.6 dB, respectively, in relation to the bearing A) are shown. The reference order value shown in FIG. 4*b* is set in the PC unit 30 in advance through user input. The reference vibration level shown in FIG. 4*b* is set by adding a buffer amount of a predetermined value to the value of a vibration level corresponding to each reference order value, which is measured during a normal operation of the detection subject device 20, or the like.

Figure 4A:
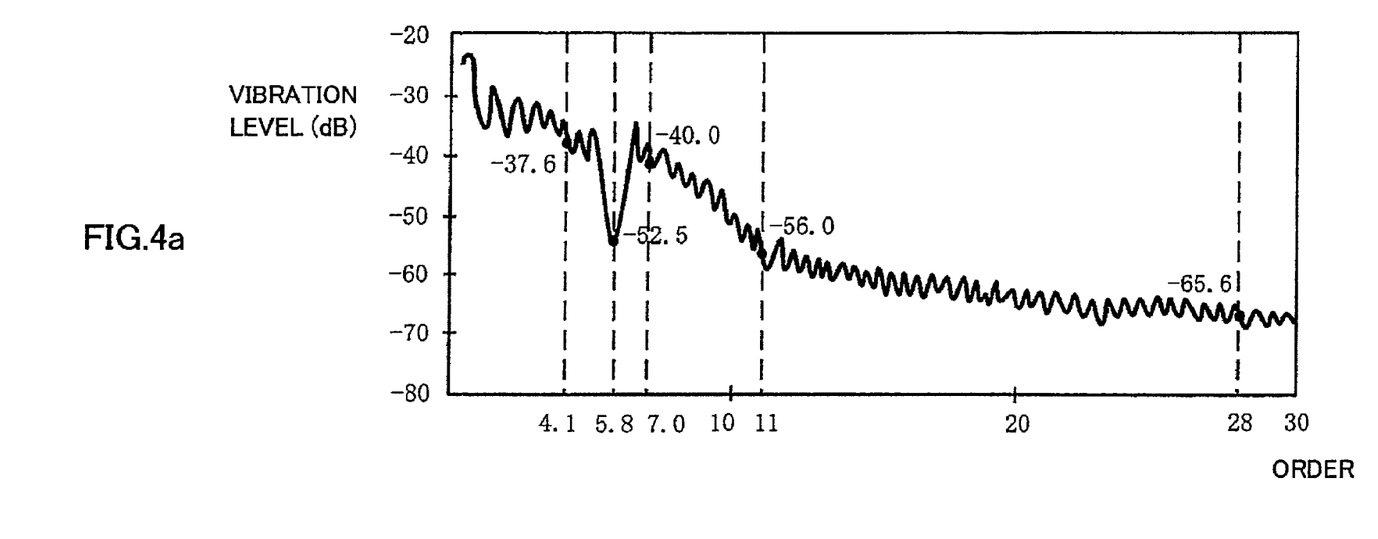
FIGS. 4a and 4b are views illustrating specific examples of a detection unit.
Figure 4B:
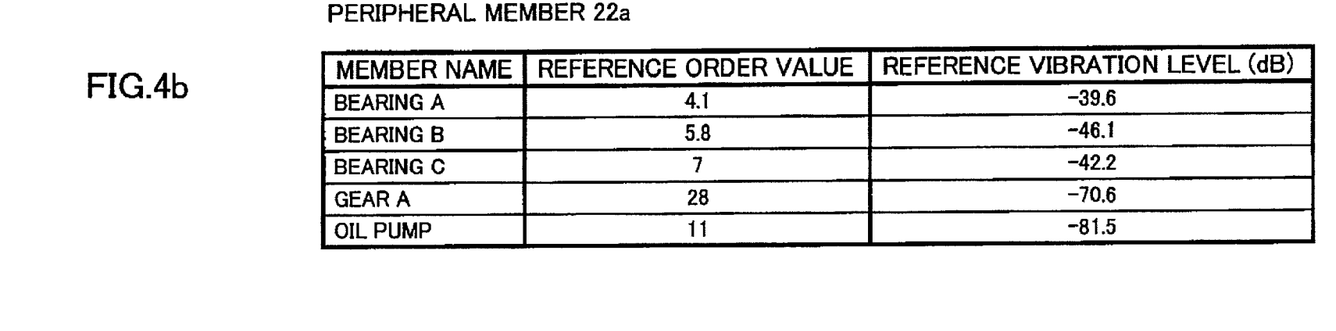

The detection unit 33 compares an actually measured vibration level corresponding to the reference order value of each of the peripheral members shown in FIG. 4*b*, from the actually measured vibration level at each vibration order shown in FIG. 4*a*, to the reference vibration levels of the respective peripheral members shown in FIG. 4*b*, and when the actually measured vibration level is greater than the reference vibration level, the detection unit 33 determines that a failure has occurred in the peripheral member that satisfies this condition.

In other words, an actually measured vibration level −37.6 dB corresponding to the reference order value 4.1 of the bearing A, for example, from the actually measured vibration level at each vibration order shown in FIG. 4, is compared to the reference vibration level −39.6 dB of the bearing A. In this case, the actually measured vibration level (−37.6 dB) is smaller than the reference vibration level (−39.6 dB), and it is therefore determined that a failure has not occurred in the bearing A. When similar processing is performed on another peripheral member, the actually measured vibration level (−52.5 dB) of the bearing B is greater than the reference vibration level (−46.1 dB), and it is therefore determined that a failure has occurred in the bearing B.

As described above, the detection unit 33 detects the presence of a failure in the detection subject device 20 using the actually measured vibration level at each vibration order, shown in FIG. 4*a*, and the reference value data shown in FIG. 4*b*.

(Failure Detect Logic of Failure Detect Device)

Figure 5:
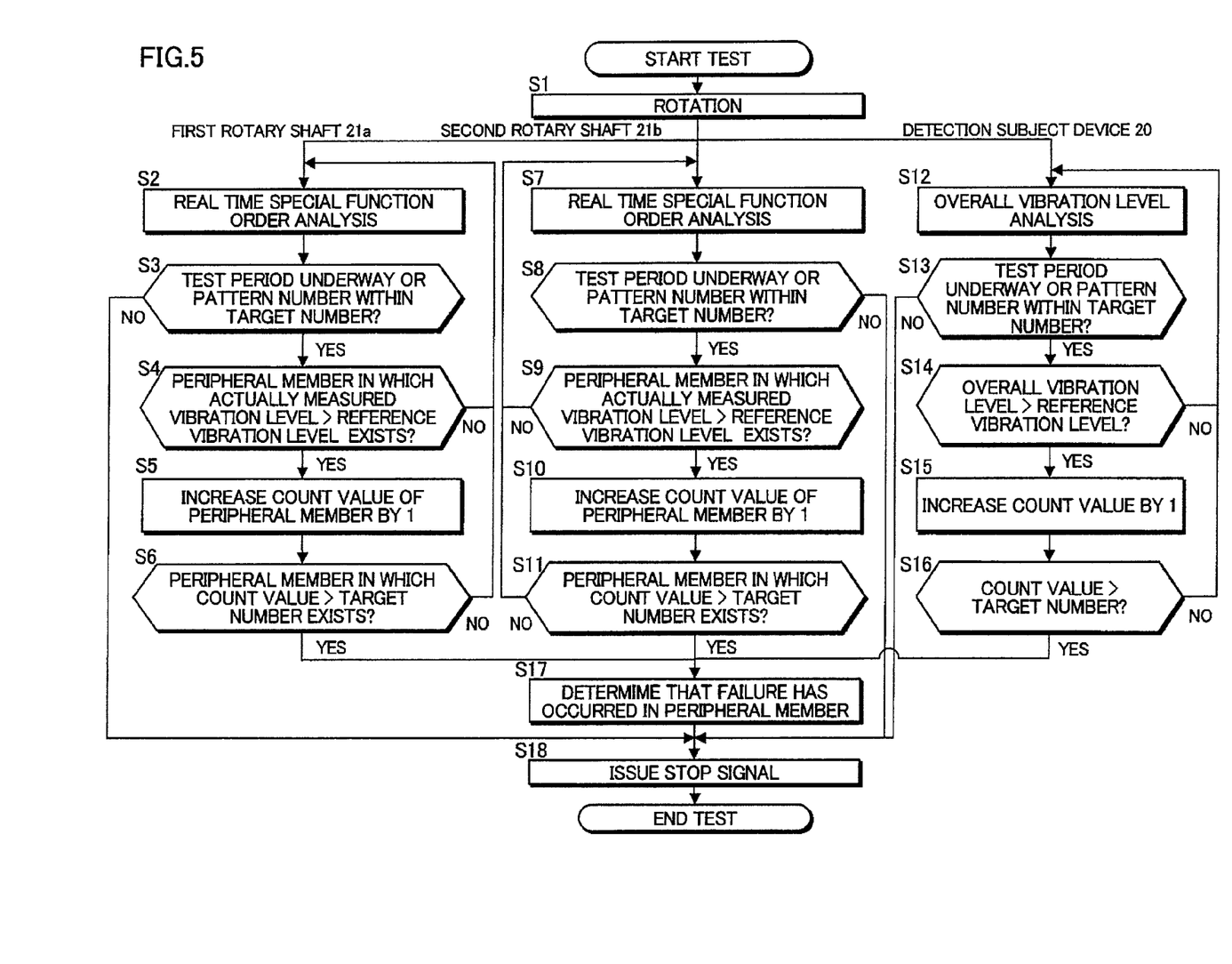
FIG. 5 is a flowchart showing failure detect logic of the failure detect device according to this embodiment.

Failure detect logic of the failure detect device 10 according to this embodiment will now be described using FIG. 5. FIG. 5 is a flowchart showing failure detect logic of the failure detect device 10 according to this embodiment. Here, the failure detect logic of the failure detect device 10 following the start of a durability test performed on the detection subject device 20 will be described.

First, rotation begins (S1). Here, rotation of the first rotary shaft 21*a* and second rotary shaft 21*b* provided in the detection subject device 20 begins. It should be noted that the first rotary shaft 21*a* and the second rotary shaft 21*b* rotate such that a gear ratio between the two varies continuously.

When rotation begins in the step S1, the failure detect device 10 performs the processing of steps S2 to S6, the processing of steps S7 to S11, and the processing of steps S12 to S16 in parallel. First, the processing of the steps S2 to S6 will be described.

Figure 6:
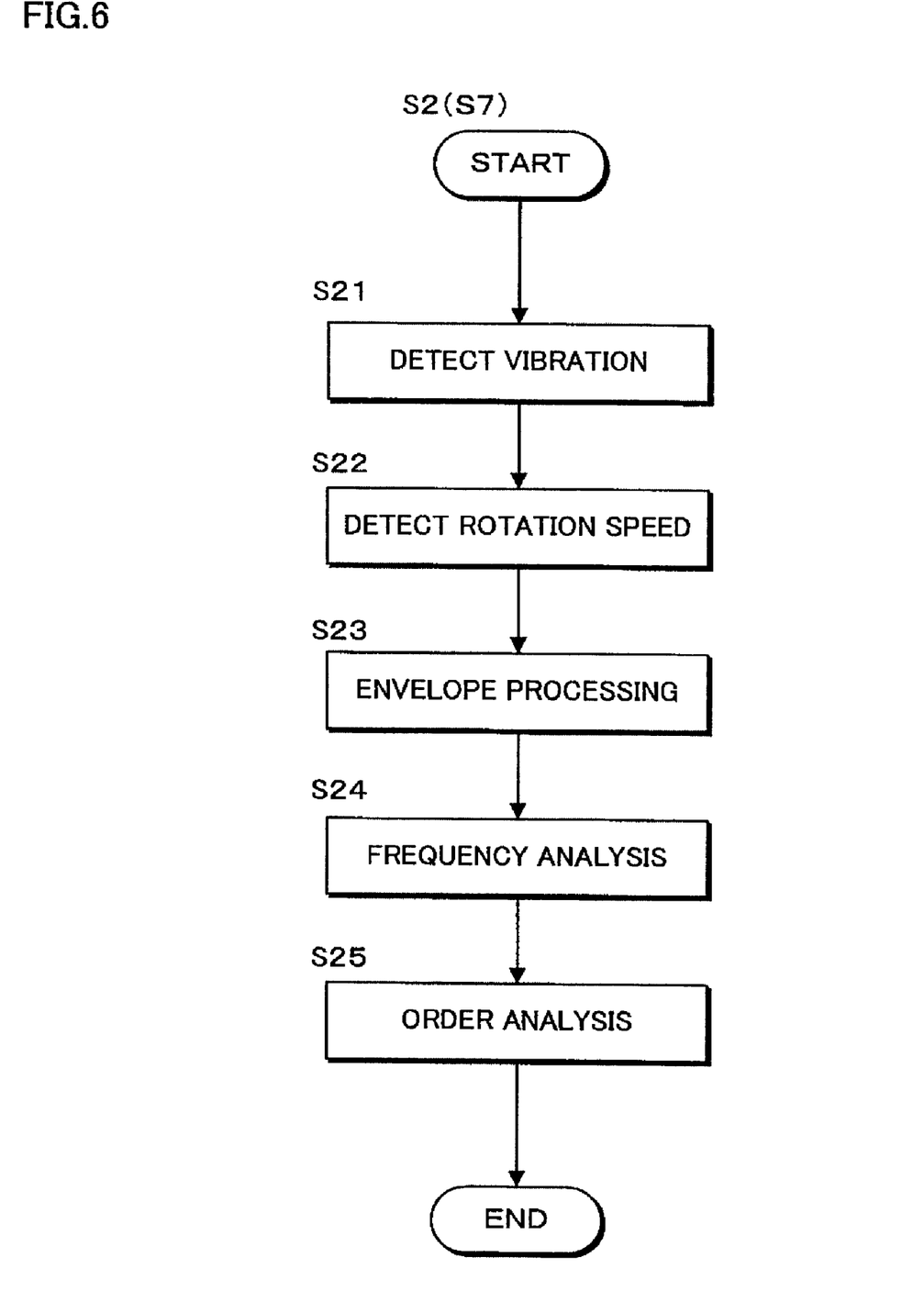
FIG. 6 is a flowchart showing a processing example of real time special function order analysis.

In the step S2, the failure detect device 10 performs real time special function order analysis (S2). The processing of the step S2 is shown in detail in FIG. 6. FIG. 6 is a flowchart showing a processing example of the real time special function order analysis.

In a step S21 of FIG. 6, the failure detect device 10 detects vibration (S21). Here, the vibration detection unit 11 detects a signal expressing the vibration of the detection subject device 20.

Next, in a step S22, the failure detect device 10 detects the rotation speed (S22). Here, the first rotation speed detection unit 12*a* detects the rotation speed of the first rotary shaft 21*a*.

Next, in a step S23, the failure detect device 10 implements envelope processing (S23). Here, the envelope processing unit 32*a* implements envelope processing on the signal detected in the step S21.

Next, in a step S24, the failure detect device 10 performs frequency analysis (S24). Here, the frequency analysis unit 32*b* calculates a frequency spectrum by implementing frequency conversion processing on the signal subjected to envelope processing in the step S23 using an FFT algorithm or the like.

Next, in a step S25, the failure detect device 10 performs order analysis (S25). Here, the order analysis unit 32c determines the actually measured vibration level at each vibration order of the first rotary shaft 21a by dividing a frequency component of the frequency spectrum calculated in the step S24 by the rotation speed detected in the step S22.

Returning to FIG. 5, in a step S3, the failure detect device 10 determines whether or not a test period is underway or a number of patterns is within a target number (S3). Here, the detection unit 33 determines whether or not a preset test time (10 hours, for example) for testing the detection subject device 20 is underway or a preset number of test patterns (for example, a Japan 10/15 mode pattern) has been completed. This processing is performed to determine whether or not a durability test is underway in the detection subject device 20.

When an affirmative determination is made in the step S3 (S3, YES), the routine advances to a step S4. When a negative determination is made in the step S3 (S3, NO), the routine advances to a step S18, in which a stop signal is issued (S18) to stop testing of the detection subject device 20.

In the step S4, the failure detect device 10 determines whether or not a peripheral member 22a in which the actually measured vibration level is greater than the reference vibration level (threshold) exists (S4). Here, the detection unit 33 determines whether or not a peripheral member 22a in which the actually measured vibration level is greater than the reference vibration level exists on the basis of data relating to the actually measured vibration level at each vibration order of the first rotary shaft 21a, determined in the step S25, and the reference value data held by the reference value holding unit 34.

When an affirmative determination is made in the step S4 (S4, YES), the routine advances to a step S5. When a negative determination is made in the step S4 (S4, NO), the routine returns to the step S2, in which the processing described above is repeated.

In the step S5, the failure detect device 10 increases a count value set for the peripheral member 22a by 1 (S5). Here, the detection unit 33 increases the count value of the peripheral member 22a for which an affirmative determination was made in the step S4 by 1. The count value is managed by the PC unit 30 in relation to each peripheral member 22a.

The routine then advances to a step S6, in which the failure detect device 10 determines whether or not a peripheral member 22a in which the count value is greater than a target number (threshold) exists (S6). When an affirmative determination is made in the step S6 (S6, YES), the routine advances to a step S17. When a negative determination is made in the step S6 (S6, NO), the routine returns to the step S2, in which the processing described above is repeated.

Through the processing of the steps S2 to S6 described above, the failure detect device 10 detects the presence of a failure in the peripheral member 22a of the first rotary shaft 21a.

The processing of the steps S7 to S11 is identical to the processing of the steps S2 to S6 except that the failure detect device 10 detects the presence of a failure in the peripheral member 22b of the second rotary shaft 21b, and therefore detailed description of this processing has been omitted.

In a step S12, the failure detect device 10 performs overall vibration level analysis (S12). Here, the vibration detection unit 11 detects a signal expressing the vibration of the detection subject device 20, and the analysis unit 32 calculates the overall vibration level (to be referred to hereafter as the "actually measured overall vibration level") of the detection subject device 20 on the basis of this signal. A well-known technique is used as a method of calculating the actually measured overall vibration level, and therefore detailed description of the method has been omitted.

In a step S13, the failure detect device 10 determines whether or not the test period is underway or the number of patterns is within a target number (S13). The processing performed in the step S13 is identical to that of the step S3.

When an affirmative determination is made in the step S13 (S13, YES), the routine advances to a step S14. When a negative determination is made in the step S13 (S13, NO), the routine advances to the step S18, in which a stop signal is issued (S18) to stop testing of the detection subject device 20.

In the step S14, the failure detect device 10 determines whether or not the actually measured overall vibration level is greater than a reference overall vibration level (threshold) (S14). Here, the detection unit 33 determines whether or not the actually measured overall vibration level calculated in the step S12 is greater than a preset reference overall vibration level. This processing is performed to determine whether or not the entire detection subject device 20 is vibrating at or above a fixed magnitude.

When an affirmative determination is made in the step S14 (S14, YES), the routine advances to a step S15. When a negative determination is made in the step S14 (S14, NO), the routine returns to the step S12, in which the processing described above is repeated.

In the step S15, the failure detect device 10 increases a count value by 1 (S15). Here, the detection unit 33 increases the count value (the number of times it is determined that the entire detection subject device 20 is vibrating at or above a fixed magnitude) by 1. This count value is managed in the PC unit 30.

The routine then advances to a step S16, in which the failure detect device 10 determines whether or not the count value is greater than a target number (threshold) (S16). When an affirmative determination is made in the step S16 (S16, YES), the routine advances to the step S17. When a negative determination is made in the step S16 (S16, NO), the routine returns to the step S12, in which the processing described above is repeated.

Through the processing of the steps S12 to S16 described above, the failure detect device 10 detects the presence of a failure in the entire detection subject device 20.

In the step S17, the failure detect device 10 determines that a failure is present in the peripheral member (S17). In the step S17, it is determined that a failure has occurred in the peripheral member for which an affirmative determination was made in the step S6 or the step S11. Thus, the peripheral member that has failed can be identified. The routine then advances to the step S18, in which the failure detect device 10 issues a stop signal (S18), thereby stopping testing on the detection subject device 20.

In this failure detect logic, the failure detect device 10 detects the presence of a failure in the detection subject device 20 after the durability test has begun on the detection subject device 20. The failure detect device 10 also performs the following supplementary failure detect logic.

In this failure detect logic, the failure detect device 10 performs failure detect on the peripheral member 22a of the first rotary shaft 21a (S2 to S6) and the peripheral member 22b of the second rotary shaft 21b (S7 to S11) independently by performing the processing of the steps S2 to S6 and the processing of the steps S7 to S11 in parallel.

Figure 7A:
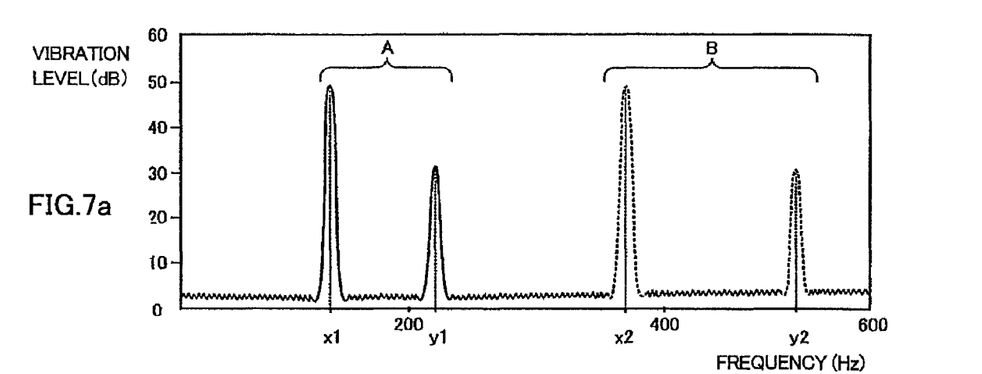
FIGS. 7a to 7c are supplementary views illustrating the flowchart shown in FIG. 5.

The reason for performing the processing independently will now be described using a specific example shown in FIG.

7. FIG. 7a shows frequency spectra calculated in the step S24 (see FIG. 6), which is common to the steps S2 and S7. In FIG. 7a, frequency spectra A, B are calculated when the gear ratio between the first rotary shaft 21a and the second rotary shaft 21b varies.

For ease of description, it is assumed here that a failure has occurred in both the peripheral member 22a and the peripheral member 22b of the detection subject device 20. In this case, vibration level peaks occurring at frequency values x1, y1 of the frequency spectrum A shown in FIG. 7a are caused by the respective failures of the peripheral member 22a and the peripheral member 22b. Similarly, vibration level peaks occurring at frequency values x2, y2 of the frequency spectrum B shown in FIG. 7a are caused by the respective failures of the peripheral member 22a and the peripheral member 22b. The reason why a ratio (x1:y1) between the frequency value x1 and the frequency value y1 differs from a ratio (x2:y2) between the frequency value x2 and the frequency value y2 is that the gear ratio between the first rotary shaft 21a and second rotary shaft 21b varies continuously.

Figure 7B:
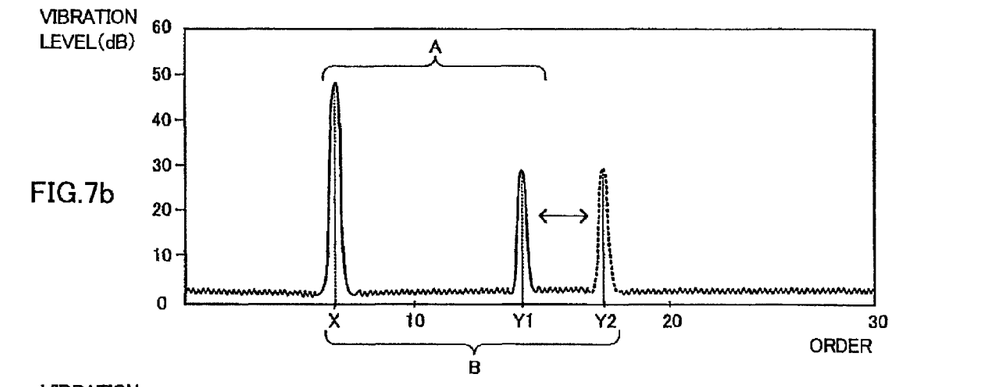

FIG. 7b shows the vibration level at each vibration order determined by dividing a frequency component of the frequency spectra A, B in FIG. 7a by the rotation speed of the first rotary shaft 21a at the time of calculation of the respective frequency spectra, or in other words the vibration level at each vibration order determined in the step S25 (see FIG. 6) performed within the step S2. The frequency value x1 of the frequency spectrum A and the frequency value x2 of the frequency spectrum B in FIG. 7a both take a frequency order value X in FIG. 7b. On the other hand, the frequency value y1 of the frequency spectrum A and the frequency value y2 of the frequency spectrum B in FIG. 7a take a frequency order value Y1 or Y2 in FIG. 7b, and are therefore not constant. The reason for this is that a rotation speed ratio between the rotation speed of the second rotary shaft 21b at the time of calculation of the frequency spectrum A and the rotation speed of the second rotary shaft 21b at the time of calculation of the frequency spectrum B differs from a rotation speed ratio of the first rotary shaft 21a. Therefore, only the peripheral member 22a can be identified from the vibration level at each vibration order shown in FIG. 7b.

Figure 7C:
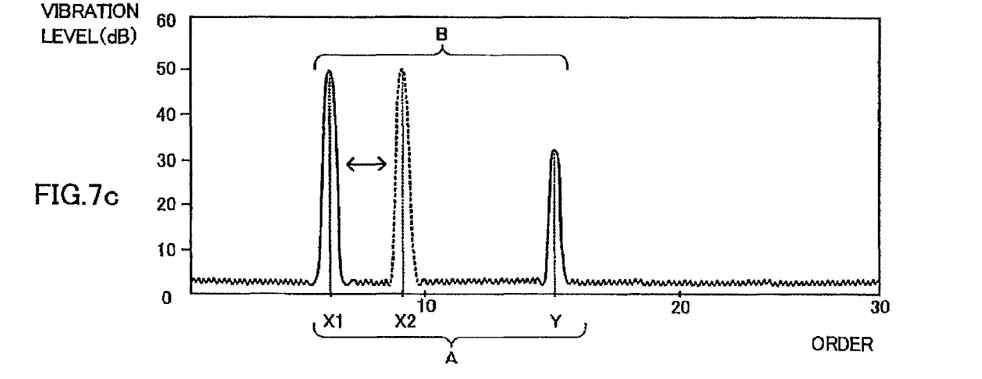

FIG. 7c shows the vibration level at each vibration order determined by dividing a frequency component of the frequency spectra A, B in FIG. 7a by the rotation speed of the second rotary shaft 21b, or in other words the vibration level at each vibration order determined in the step S7. Due to similar considerations to those described with reference to FIG. 7b, only the peripheral member 22b can be identified from the vibration level at each vibration order shown in FIG. 7c.

Hence, when the gear ratio between the first rotary shaft 21a and the second rotary shaft 21b varies continuously, or in other words during a shift, the presence of a failure in the peripheral member 22a and the peripheral member 22b, or in other words the entire detection subject device 20, can be detected appropriately by performing the processing independently.

Furthermore, in this failure detect logic, the failure detect device 10 performs the processing of the steps S12 to S16 in parallel with the processing of the steps S2 to S6 and the processing of the steps S7 to S11. In the step S17, a failure is preferably detected in the peripheral member only when an affirmative determination has been made in the step S6 or S11 and also in the step S16. By considering the presence of a failure in the entire detection subject device 20 in this manner, the failure detect precision can be improved.

Further, in this failure detect logic, the failure detect device 10 realizes a count function in which the actually measured vibration level is compared to the reference vibration level repeatedly through the processing of the steps S5 and S6 (S10 and S11, S15 and S16) and a failure is determined to have occurred in the peripheral member when the number of times it is determined that the actually measured vibration level is greater than the reference vibration level (in S15 and S16, the number of times it is determined that the entire detection subject device 20 is vibrating at or above a fixed magnitude) exceeds a predetermined number.

This processing is performed to ensure that a test is not stopped when the detection subject device 20 vibrates unexpectedly or the like, for example. Accordingly, in a case where unexpected vibration or the like is not envisaged, the processing of the steps S5 and S6 may be omitted such that when a peripheral member having a vibration level that is greater than the reference vibration level is determined to exist in the processing of the step S4, a failure is determined to have occurred in that peripheral member.

(Summary)

According to this embodiment, the failure detect device 10 (or a failure detect method) detects a failure using the actually measured vibration level at each vibration order. The vibration order used here is a parameter that does not vary even during a shift, and therefore a failure can be detected appropriately even during a shift.

Further, according to this embodiment, the failure detect device 10 calculates the frequency spectrum of the vibration detected by the vibration detection unit 11 after envelope processing has been implemented on the vibration. Therefore, when the vibration detected by the vibration detection unit 11 includes impact vibration generated due to a failure in the peripheral member, the period of this impact vibration can be extracted. As a result, a failure can be detected in the peripheral member appropriately.

Furthermore, according to this embodiment, the failure detect device 10 detects a failure on the basis of a comparison between the actually measured vibration level at each vibration order and the reference order value and reference vibration level set in relation to the peripheral member. As a result, the failed peripheral member can be identified.

Further, according to this embodiment, the failure detect device 10 detects a failure by repeating the comparison between the actually measured vibration level at each vibration order and the reference order value and reference vibration level set in relation to the peripheral member. As a result, the precision with which the failed peripheral member is identified can be improved.

Further, according to this embodiment, the failure detect device 10 can detect the presence of a failure in a peripheral member of an input shaft or an output shaft provided in a continuously variable shift mechanism or a stepped shift mechanism to be described below.

Moreover, according to this embodiment, the failure detect device 10 (failure detect method) detects the presence of a failure in the peripheral member 22a of the first rotary shaft 21a using the actually measured vibration level at each vibration order of the first rotary shaft 21a and detects the presence of a failure in the peripheral member 22b of the second rotary shaft 21b using the actually measured vibration level at each vibration order of the second rotary shaft 21b. Therefore, a failure can be detected appropriately even during a shift in which the gear ratio between the first rotary shaft 21a and the second rotary shaft 21b varies continuously.

An embodiment of this invention was described above, but the above embodiment is merely on example of application of this invention, and the technical scope of the invention is not limited to the specific constitutions of the above embodiment.

For example, in the above description, the detection subject device 20 is a continuously variable transmission, but the detection subject device 20 may be a stepped transmission having a stepped shift mechanism.

Further, the detection subject device 20 may be a device comprising only one rotary shaft (the first rotary shaft 21a, for example) having a variable rotation speed. In this case, the failure detect device 10 may detect the presence of a failure in the peripheral member 22a of the first rotary shaft 21a on the basis of detection results of the vibration detection unit 11 and the first rotation speed detection unit 12a.

Furthermore, in the above description, the reference value data held in the reference value holding unit 34 are set in relation to the respective peripheral members, but may be set in relation to various sites of the respective peripheral members. For example, when the peripheral member is a bearing, the reference value data may be set in relation to sites such as an inner wheel and an outer wheel of the bearing. In this case, the failure detect device 10 can identify a site of the peripheral member in which a failure has occurred.

This application claims priority from Japanese Patent Application 2008-237864, filed Sep. 17, 2008, which is incorporated herein by reference in its entirety.

What is claimed is:

1. A failure detect device that detects the presence of a failure in a predetermined peripheral member disposed to either one of a rotary shaft and a power transmission path that passes through the rotary shaft by analyzing a vibration generated in a device provided with the rotary shaft when the rotary shaft is rotated, comprising:
   a vibration detecting unit that detects the vibration of the device;
   a rotation speed detecting unit that detects a rotation speed of the rotary shaft;
   an analyzing unit that calculates a frequency spectrum of the vibration detected by the vibration detecting unit and determining an actually measured vibration level at each vibration order by dividing a frequency component of the calculated frequency spectrum by the rotation speed detected by the rotation speed detecting unit; and
   a detecting unit that detects the presence of a failure in the predetermined peripheral member on the basis of the actually measured vibration level at each vibration order determined by the analyzing unit.

2. The failure detect device as defined in claim 1, wherein the analyzing unit calculates the frequency spectrum of the vibration detected by the vibration detecting unit after envelope processing has been implemented on the vibration.

3. The failure detect device as defined in claim 1, further comprising a reference value holding unit that holds a reference order value and a reference vibration level set in relation to the predetermined peripheral member,
   wherein the detecting unit compares an actually measured vibration level corresponding to the reference order value, from the actually measured vibration level at each vibration order, with the reference vibration level, and determines the presence of a failure in the predetermined peripheral member when the actually measured vibration level is greater than the reference vibration level.

4. The failure detect device as defined in claim 1, further comprising a reference value holding unit that holds a reference order value and a reference vibration level set in relation to the predetermined peripheral member,
   wherein the detecting unit performs processing for comparing an actually measured vibration level corresponding to the reference order value, from the actually measured vibration level at each vibration order, with the reference vibration level repeatedly, and determines the presence of a failure in the predetermined peripheral member when a number of times the actually measured vibration level is determined to be greater than the reference vibration level exceeds a predetermined number.

5. The failure detect device as defined in claim 1, wherein the rotary shaft is either one of an input shaft and an output shaft attached to either one of a continuously variable mechanism and a stepped shift mechanism.

6. A failure detect device that detects the presence of a failure in either one of a predetermined input shaft peripheral member, disposed to either one of an input shaft attached to either one of a continuously variable mechanism and a stepped shift mechanism and a power transmission path that passes through the input shaft, and a predetermined output shaft peripheral member, disposed to either one of an output shaft attached to either one of the continuously variable mechanism and the stepped shift mechanism and a power transmission path that passes through the output shaft, by analyzing a vibration generated in a device provided with the input shaft and the output shaft when the input shaft and the output shaft are rotated, comprising:
   a vibration detecting unit that detects the vibration of the device;
   a first rotation speed detecting unit that detects a rotation speed of the input shaft;
   a second rotation speed detecting unit that detects a rotation speed of the output shaft;
   an analyzing unit that calculates a frequency spectrum of the vibration detected by the vibration detecting unit, determining an actually measured vibration level at each vibration order of the input shaft by dividing a frequency component of the calculated frequency spectrum by the rotation speed detected by the first rotation speed detecting unit, and determining an actually measured vibration level at each vibration order of the output shaft by dividing a frequency component of the calculated frequency spectrum by the rotation speed detected by the second rotation speed detecting unit; and
   a detecting unit that detects the presence of a failure in the predetermined input shaft peripheral member on the basis of the actually measured vibration level at each vibration order of the input shaft, determined by the analyzing unit, and detecting the presence of a failure in the predetermined output shaft peripheral member on the basis of the actually measured vibration level at each vibration order of the output shaft, determined by the analyzing unit.

7. A failure detect method for detecting the presence of a failure in a predetermined peripheral member disposed to either one of a rotary shaft and a power transmission path that passes through the rotary shaft by analyzing a vibration generated in a device provided with the rotary shaft when the rotary shaft is rotated, comprising:
   a vibration detecting step for detecting the vibration of the device;
   a rotation speed detecting step for detecting a rotation speed of the rotary shaft;
   an analyzing step for calculating a frequency spectrum of the vibration detected by the vibration detecting step and determining an actually measured vibration level at each vibration order by dividing a frequency component of the calculated frequency spectrum by the rotation speed detected by the rotation speed detecting step; and a detecting step for detecting the presence of a failure in the predetermined peripheral member on the basis of the actually measured vibration level at each vibration order determined by the analyzing step.

8. The failure detect method as defined in claim 7, wherein the analyzing step calculates the frequency spectrum of the vibration detected by the vibration detecting step after envelope processing has been implemented on the vibration.

9. The failure detect method as defined in claim 7, wherein the detecting step compares an actually measured vibration level corresponding to a reference order value set in relation to the predetermined peripheral member, from the actually measured vibration level at each vibration order, with a reference vibration level set in relation to the predetermined peripheral member, and determines the presence of a failure in the predetermined peripheral member when the actually measured vibration level is greater than the reference vibration level.

10. The failure detect method as defined in claim 7, wherein the detecting step performs processing for comparing an actually measured vibration level corresponding to a reference order value set in relation to the predetermined peripheral member, from the actually measured vibration level at each vibration order, with a reference vibration level set in relation to the predetermined peripheral member repeatedly, and determines the presence of a failure in the predetermined peripheral member when a number of times the actually measured vibration level is determined to be greater than the reference vibration level exceeds a predetermined number.

11. The failure detect method as defined in claim 7, wherein the rotary shaft is either one of an input shaft and an output shaft attached to either one of a continuously variable mechanism and a stepped shift mechanism.

12. A failure detect method for detecting the presence of a failure in either one of a predetermined input shaft peripheral member, disposed to either one of an input shaft attached to either one of a continuously variable mechanism and a stepped shift mechanism and a power transmission path that passes through the input shaft, and a predetermined output shaft peripheral member, disposed to either one of an output shaft attached to either one of the continuously variable mechanism and the stepped shift mechanism and a power transmission path that passes through the output shaft, by analyzing a vibration generated in a device provided with the input shaft and the output shaft when the input shaft and the output shaft are rotated, comprising:
 a vibration detecting step for detecting the vibration of the device;
 a first rotation speed detecting step for detecting a rotation speed of the input shaft;
 a second rotation speed detecting step for detecting a rotation speed of the output shaft;
 an analyzing step for calculating a frequency spectrum of the vibration detected by the vibration detecting step, determining an actually measured vibration level at each vibration order of the input shaft by dividing a frequency component of the calculated frequency spectrum by the rotation speed detected by the first rotation speed detecting step, and determining an actually measured vibration level at each vibration order of the output shaft by dividing a frequency component of the calculated frequency spectrum by the rotation speed detected by the second rotation speed detecting step; and
 a detecting step for detecting the presence of a failure in the predetermined input shaft peripheral member on the basis of the actually measured vibration level at each vibration order of the input shaft, determined by the analyzing step and detecting the presence of a failure in the predetermined output shaft peripheral member on the basis of the actually measured vibration level at each vibration order of the output shaft, determined by the analyzing step.

13. A failure detect device that detects the presence of a failure in a predetermined peripheral member disposed to either one of a rotary shaft and a power transmission path that passes through the rotary shaft by analyzing a vibration generated in a device provided with the rotary shaft when the rotary shaft is rotated, comprising:
 vibration detecting means for detecting the vibration of the device;
 rotation speed detecting means for detecting a rotation speed of the rotary shaft;
 analyzing means for calculating a frequency spectrum of the vibration detected by the vibration detecting means and determining an actually measured vibration level at each vibration order by dividing a frequency component of the calculated frequency spectrum by the rotation speed detected by the rotation speed detecting means; and
 detecting means for detecting the presence of a failure in the predetermined peripheral member on the basis of the actually measured vibration level at each vibration order determined by the analyzing means.

14. The failure detect device as defined in claim 13, wherein the analyzing means calculates the frequency spectrum of the vibration detected by the vibration detecting means after envelope processing has been implemented on the vibration.

15. The failure detect device as defined in claim 13, further comprising reference value holding means for holding a reference order value and a reference vibration level set in relation to the predetermined peripheral member,
 wherein the detecting means compares an actually measured vibration level corresponding to the reference order value, from the actually measured vibration level at each vibration order, with the reference vibration level, and determines the presence of a failure in the predetermined peripheral member when the actually measured vibration level is greater than the reference vibration level.

16. The failure detect device as defined in claim 13, further comprising reference value holding means for holding a reference order value and a reference vibration level set in relation to the predetermined peripheral member,
 wherein the detecting means performs processing for comparing an actually measured vibration level corresponding to the reference order value, from the actually measured vibration level at each vibration order, with the reference vibration level repeatedly, and determines the presence of a failure in the predetermined peripheral member when a number of times the actually measured vibration level is determined to be greater than the reference vibration level exceeds a predetermined number.

17. The failure detect device as defined in claim 13, wherein the rotary shaft is either one of an input shaft and an output shaft attached to either one of a continuously variable mechanism and a stepped shift mechanism.

18. A failure detect device that detects the presence of a failure in either one of a predetermined input shaft peripheral member, disposed to either one of an input shaft attached to either one of a continuously variable mechanism and a stepped shift mechanism and a power transmission path that passes through the input shaft, and a predetermined output shaft peripheral member, disposed to either one of an output shaft attached to either one of the continuously variable mechanism and the stepped shift mechanism and a power transmission path that passes through the output shaft, by analyzing a vibration generated in a device provided with the input shaft and the output shaft when the input shaft and the output shaft are rotated, comprising:

vibration detecting means for detecting the vibration of the device;

first rotation speed detecting means for detecting a rotation speed of the input shaft;

second rotation speed detecting means for detecting a rotation speed of the output shaft;

analyzing means for calculating a frequency spectrum of the vibration detected by the vibration detecting means, determining an actually measured vibration level at each vibration order of the input shaft by dividing a frequency component of the calculated frequency spectrum by the rotation speed detected by the first rotation speed detecting means, and determining an actually measured vibration level at each vibration order of the output shaft by dividing a frequency component of the calculated frequency spectrum by the rotation speed detected by the second rotation speed detecting means; and detecting means for detecting the presence of a failure in the predetermined input shaft peripheral member on the basis of the actually measured vibration level at each vibration order of the input shaft, determined by the analyzing means, and detecting the presence of a failure in the predetermined output shaft peripheral member on the basis of the actually measured vibration level at each vibration order of the output shaft, determined by the analyzing means.

* * * * *